United States Patent
Zhang et al.

(10) Patent No.: US 9,337,494 B2
(45) Date of Patent: May 10, 2016

(54) IONIC LAYER WITH OXYGEN EVOLUTION REACTION CATALYST FOR ELECTRODE PROTECTION

(75) Inventors: Jingxin Zhang, Rochester, NY (US); Jeanette E. Owejan, Honeoye, NY (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 746 days.

(21) Appl. No.: 12/352,015

(22) Filed: Jan. 12, 2009

(65) Prior Publication Data
US 2010/0178582 A1    Jul. 15, 2010

(51) Int. Cl.
| H01M 4/90 | (2006.01) |
| H01M 4/88 | (2006.01) |
| H01M 8/10 | (2016.01) |
| H01M 4/92 | (2006.01) |
| H01M 4/86 | (2006.01) |

(52) U.S. Cl.
CPC ............ *H01M 4/9016* (2013.01); *H01M 4/881* (2013.01); *H01M 4/8807* (2013.01); *H01M 4/9075* (2013.01); *H01M 8/1004* (2013.01); *H01M 4/9041* (2013.01); *H01M 4/9058* (2013.01); *H01M 4/9066* (2013.01); *H01M 4/92* (2013.01); *H01M 8/103* (2013.01); *H01M 8/1023* (2013.01); *H01M 8/1025* (2013.01); *H01M 8/1027* (2013.01); *H01M 8/1032* (2013.01); *H01M 8/1034* (2013.01); *H01M 8/1039* (2013.01); *H01M 2004/8684* (2013.01); *H01M 2004/8689* (2013.01); *Y02E 60/521* (2013.01); *Y10T 29/49112* (2015.01)

(58) Field of Classification Search
None
See application file for complete search history.

(56) References Cited

U.S. PATENT DOCUMENTS

| 6,517,962 | B1 | 2/2003 | Knights et al. | |
| 6,936,370 | B1 * | 8/2005 | Knights et al. | 429/482 |
| 2004/0013935 | A1 * | 1/2004 | Ye et al. | 429/44 |
| 2004/0115515 | A1 * | 6/2004 | Ueda et al. | 429/40 |
| 2005/0058881 | A1 * | 3/2005 | Goebel et al. | 429/40 |
| 2005/0095494 | A1 * | 5/2005 | Fuss et al. | 429/39 |
| 2007/0072036 | A1 * | 3/2007 | Berta et al. | 429/33 |
| 2007/0092777 | A1 * | 4/2007 | Zhamu et al. | 429/33 |
| 2007/0111078 | A1 * | 5/2007 | Tanno | 429/34 |
| 2008/0213644 | A1 * | 9/2008 | Shindoh et al. | 429/30 |

FOREIGN PATENT DOCUMENTS

| CN | 1744360 A | 3/2006 | |
| CN | 1967916 A | 5/2007 | |
| EP | 1414089 A | 4/2004 | |
| WO | WO 2006/063611 | * 6/2006 | ................. C08J 5/22 |

* cited by examiner

*Primary Examiner* — Jeremiah Smith
(74) *Attorney, Agent, or Firm* — Brooks Kushman P.C.

(57) ABSTRACT

A fuel cell includes a first electrode and a second electrode with an ion conducting polymer membrane positioned between these electrodes. The fuel cell further comprises a first OER catalyst-containing ionic layer positioned between the first electrode and the ion conducting polymer membrane. The first OER catalyst-containing layer includes an OER catalyst-containing compound, an ion conducting polymer and carbon. Characteristically, the weight ratio of ion conducting polymer to carbon is from about 10 to about 100. A method for forming the fuel cell is also provided.

13 Claims, 8 Drawing Sheets

IONIC LAYER WITH OXYGEN EVOLUTION REACTION CATALYST FOR ELECTRODE PROTECTION

BACKGROUND OF THE INVENTION

1. Field of the Invention

In at least one aspect, the present invention is related to stabilization of electrodes for fuel cell applications.

2. Background Art

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM"), to provide ion transport between the anode and cathode.

In the PEM type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which an ion conductive solid polymer membrane has an anode catalyst on one face, and a cathode catalyst on the opposite face. Each electrode has finely divided catalyst particles (for example, platinum particles), supported on carbon particles, to promote oxidation of hydrogen at the anode and reduction of oxygen at the cathode. Electrons stripped off the hydrogen power the electric motor and then travel through the circuit to the cathode side. Protons flow from the anode through the ion conductive polymer membrane to the cathode where they combine with oxygen to form water, which is discharged from the cell. The MEA is sandwiched between a pair of porous gas diffusion layers ("GDL"), which in turn are sandwiched between a pair of non-porous, electrically conductive elements or plates. The anode and cathode gas diffusion layers of a typical PEM fuel cell are formed of porous conductive materials, such as woven graphite, graphitized sheets, or carbon paper to enable the fuel or air to disperse over the surface of the electrode. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell should be thin, chemically stable, proton transmissive, non-electrically conductive and gas impermeable. In typical applications, fuel cells are provided in arrays of many individual fuel cells called stacks in order to provide high levels of electrical power.

Although these prior art fuel cell configurations work reasonably well, significant problems arise in these devices during global or local fuel starvation and during start/stop conditions. Specifically, oxidation of electrode carbon support results in damages to the electrode structure, decreased fuel cell performance, and decreased service lifetime of the cell.

Accordingly, there is a need for fuel cell devices having electrodes that are resistant to oxidation.

SUMMARY OF THE INVENTION

The present invention solves one or more problems of the prior art by providing in at least one embodiment a fuel cell with improved stability. The fuel cell of this embodiment includes a first electrode and a second electrode with an ion conducting polymer layer positioned between the electrode and the polymeric membrane. The fuel cell further comprises a first oxygen evolution ("OER") catalyst-containing layer positioned between the first electrode and the polymer electrolyte membrane. The first OER catalyst-containing layer includes an OER catalyst-containing compound, an ion conducting polymer and carbon. Characteristically, the weight ratio of ion conducting polymer to carbon is from about 10 to about 100.

In another embodiment of the invention, a method for forming the fuel cell set forth above is provided. The method of this embodiment comprises contacting a substrate with an OER catalyst-containing layer. In some instances the substrate is the polymer electrolyte membrane. In other instances the substrate is the first electrodes. In each case the OER catalyst-containing layer/substrate is then further assembled into a membrane electrode assembly that may then be incorporated into a fuel cell.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF EXEMPLARY EMBODIMENTS

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

Throughout this application, where publications are referenced, the disclosures of these publications in their entireties are hereby incorporated by reference into this application to more fully describe the state of the art to which this invention pertains.

Figure 1:
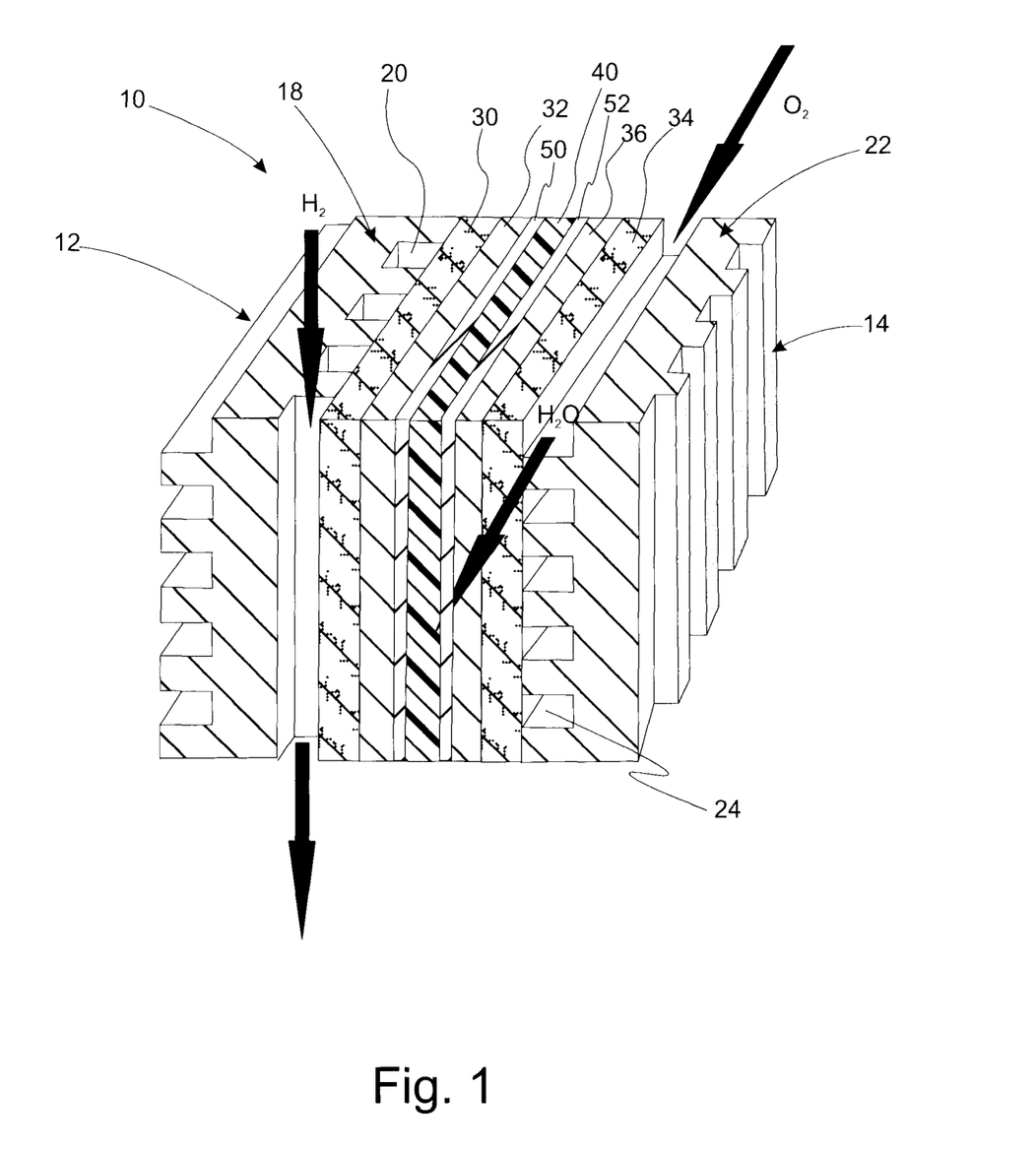
FIG. 1 provides a schematic illustration of a fuel cell incorporating the OER catalyst-containing layer of an embodiment of the present invention.

With reference to FIG. 1, a perspective view of a fuel cell incorporating the bipolar plates of the present embodiment is provided. PEM fuel cell 10 includes bipolar plates 12, 14. Within bipolar plate 12, anode flow field 18 includes one or more channels 20 for introducing a first gas to the fuel cell 10. Similarly, bipolar plate 14 includes cathode gas flow field 22, which includes one or more channels 24 for introducing a second gas into fuel cell 10. Typically, the first gas includes a fuel such as hydrogen while the second gas includes an oxidant such as oxygen. Anode diffusion layer 30 is positioned between anode flow field 18 and anode layer (i.e., electrode) 32 while cathode diffusion layer 34 is positioned between cathode flow field 22 and cathode layer (i.e., electrode) 36. Ion conductive membrane 40 is interposed between anode electrode 32 and cathode electrode 36. In particular, Ion conductive membrane 40 is a proton-conducting layer. PEM fuel cell 10 also includes an OER catalyst-containing layer. In one refinement, PEM fuel cell 10 includes OER catalyst-containing layer 50, which is located between anode electrode 32 and ion conductive membrane 40. In another refinement, PEM fuel cell 10 includes OER catalyst-containing layer 52, which is located between cathode electrode 36 and ion conductive membrane 40. In still another variation, PEM fuel cell 10 includes both OER catalyst-containing layer 50, which is located between anode electrode 32 and ion conductive membrane 40 and OER catalyst-containing layer 52 which is located between cathode electrode 36 and ion conductive membrane 40.

Figure 2:
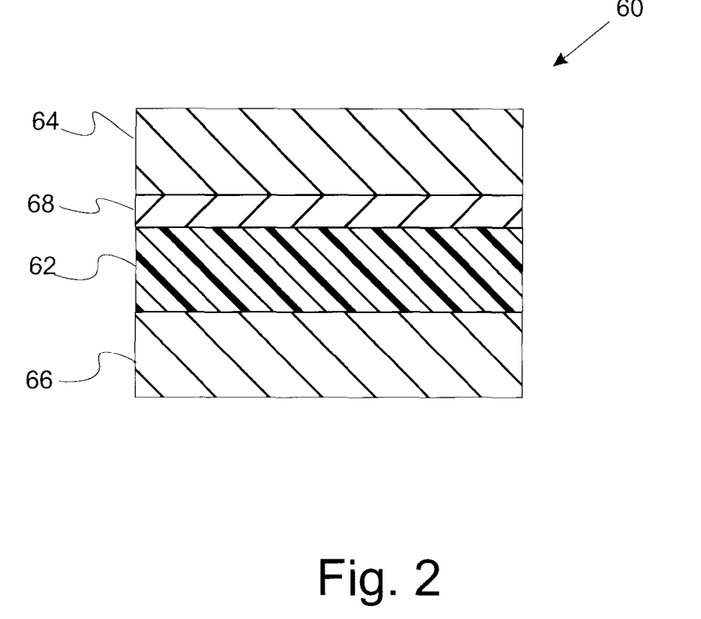
FIG. 2 provides a schematic illustration of a membrane electrode assembly including a single OER catalyst-containing layer.

With reference to FIG. 2, a variation of a membrane electrode assembly incorporating an OER catalyst-containing membrane is provided. MEA 60 includes ion-conducting membrane 62, which is interposed between first electrode 64 and second electrode 66. First electrode 64 layers comprise a first catalyst while second electrode 66 comprises a second catalyst. In a refinement, the first catalyst and second catalyst are each independently selected from the group consisting of precious metals, alloys of precious metals and mixtures of precious metals. In a further refinement, the first catalyst and second catalyst are each independently selected from the group consisting of platinum, ruthenium, platinum-containing compounds, ruthenium-containing compounds and mixtures thereof.

Still referring to FIG. 2, OER catalyst-containing ionic layer 68 is interposed between first electrode layer 64 and membrane 62. In a refinement, first electrode 64 is an anode and second electrode 66 is a cathode. In another refinement, first electrode 64 is a cathode and second electrode 66 is an anode.

Figure 3:
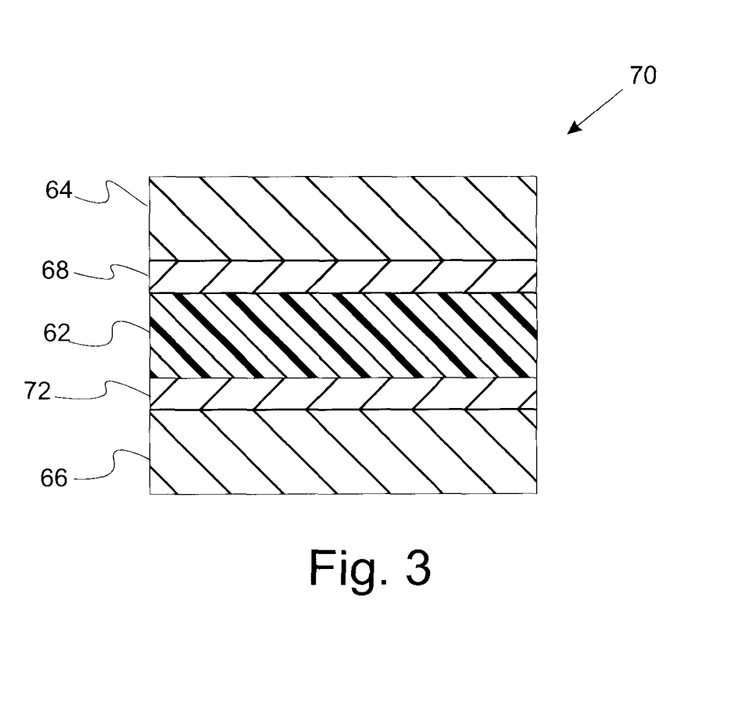
FIG. 3 provides a schematic illustration of a membrane electrode assembly including two OER catalyst-containing layers.

With reference to FIG. 3, a variation of a membrane electrode assembly incorporating an OER catalyst-containing ionic layer is provided. MEA 70 includes ion conducting/membrane 62 which is interposed between first electrode 64 and second electrode 66. First electrode 64 layers comprise a first catalyst while second electrode 66 comprises a second catalyst. The details of the first and second catalysts are set forth in connection with the description of FIG. 2. OER catalyst containing ionic layer 68 is interposed between first electrode layer 64 and membrane 62. OER catalyst-containing ionic layer 72 is interposed between second electrode layer 66 and membrane 62. In a refinement, first electrode 64 is an anode and second electrode 66 is a cathode. In another refinement, first electrode 64 is a cathode and second electrode 66 is an anode.

As set forth above, the fuels cells and the membrane electrode assemblies include an ion conducting membrane. In one refinement, these ion-conducting layers include an ion-conducting polymer. Suitable examples of ion conducting polymers include, but are not limited, to Nafion ionomer, sulfonated polytrifluorostyrene, sulfonated hydrocarbon polymer, polyimide, polyvinylidene fluoride, polybenzimidazole, polysulfone, polyethersulfone, polyetherketone, polyphenylenesulfide, polyphenyleneoxide, polyphosphazene, polyethylenenaphthalate, polyamide, and polyester. In another refinement, the ion-conducting layer is an ion conducting membrane.

The OER catalyst-containing ionic layers set forth above each include an OER catalyst-containing compound, an ion conducting polymer and carbon. As used herein OER catalyst-containing compound includes any OER catalyst-containing compound including an OER metal itself. In a refinement, the OER catalyst-containing compound includes a metal oxide typically supported on carbon. In yet another refinement, the OER catalyst comprises a component selected from the group consisting of ruthenium oxides, ruthenium oxide-titanium oxide, indium oxides, and combinations thereof. This structure may be described by the following formulae $RuO_z$, $RuO_z$—$TiO_2$, where z is a number from 1.5 to 2.5. In a further refinement, the OER catalyst comprises an iridium-containing compound, and in particular, an iridium oxide-containing compound. An example of a useful iridium-containing compound is provided by the following formula:

$$Ir_xO_y,$$

wherein:
x is from about 0.8 to about 1.2, and
y is from about 1.8 to about 2.4.

In a variation of the present embodiment, the OER catalyst-containing ionic layer is characterized by the weight ratio of ion conducting polymer to carbon. In one refinement, the weight ratio of ion conducting polymer to carbon is from about 10 to about 100. In another refinement, the weight ratio of ion conducting polymer to carbon is from about 20 to about 70. In still another refinement, the weight ratio of ion conducting polymer to carbon is from about 40 to about 60. In yet another refinement, the weight ratio of ion conducting polymer to carbon is about 55. Suitable examples of ion conducting polymers for inclusion in the OER catalyst-containing ionic layer include, but are not limited, to Nafion ionomer, sulfonated polytrifluorostyrene, sulfonated hydrocarbon polymer, polyimide, polyvinylidene fluoride, polybenzimidazole, polysulfone, polyethersulfone, polyetherketone, polyphenylenesulfide, polyphenyleneoxide, polyphosphazene, polyethylenenaphthalate, polyamide, and polyester. In another refinement, the ion-conducting layer is an ion conducting membrane.

In another variation, the amount of OER metal (whether free or compound) present in the OER catalyst-containing ionic layers is from about 0.0001 mg/cm$^2$ to about 0.01 mg/cm$^2$. In a refinement, the amount of OER metal (whether free or compound) present in the OER catalyst-containing ionic layers is from about 0.0005 mg/cm$^2$ to about 0.005 mg/cm$^2$. In another refinement, the OER catalyst-containing ionic layer has a polymer loading from about 0.1 mg/cm$^2$ to about 0.2 mg/cm$^2$; the amount of transition metal loading is from 0.0005 mg/cm$^2$ to 0.005 mg/cm$^2$.

In still another variation of the present embodiment, the OER catalyst-containing ionic layer is characterized by a polymer loading from 0.05 mg/cm$^2$ to 0.4 mg/cm$^2$. In a refinement, the polymer loading is from 0.1 mg/cm$^2$ to 0.2 mg/cm$^2$. In another refinement, the polymer loading is from 0.14 mg/cm$^2$ to 0.18 mg/cm$^2$.

In still another variation, the OER catalyst-containing ionic layer has a thickness from about $0.1 \times 10^{-6}$ m to about $2.0 \times 10^{-6}$ m. In a refinement, the OER catalyst-containing layer has a thickness from about of $0.7 \times 10^{-6}$ m to about $1.2 \times 10^{-6}$ m.

In yet another variation of the present embodiment, the OER catalyst-containing layers are iridium-containing ionic layer that is substantially free of other precious metal containing compounds (include element precious metals). In a refinement, the amount of precious metal compounds other than iridium is less about 0.00005 mg/cm$^2$. In another refinement, the amount of precious metal compounds other than iridium is less about 0.00001 mg/cm$^2$.

Figure 4:
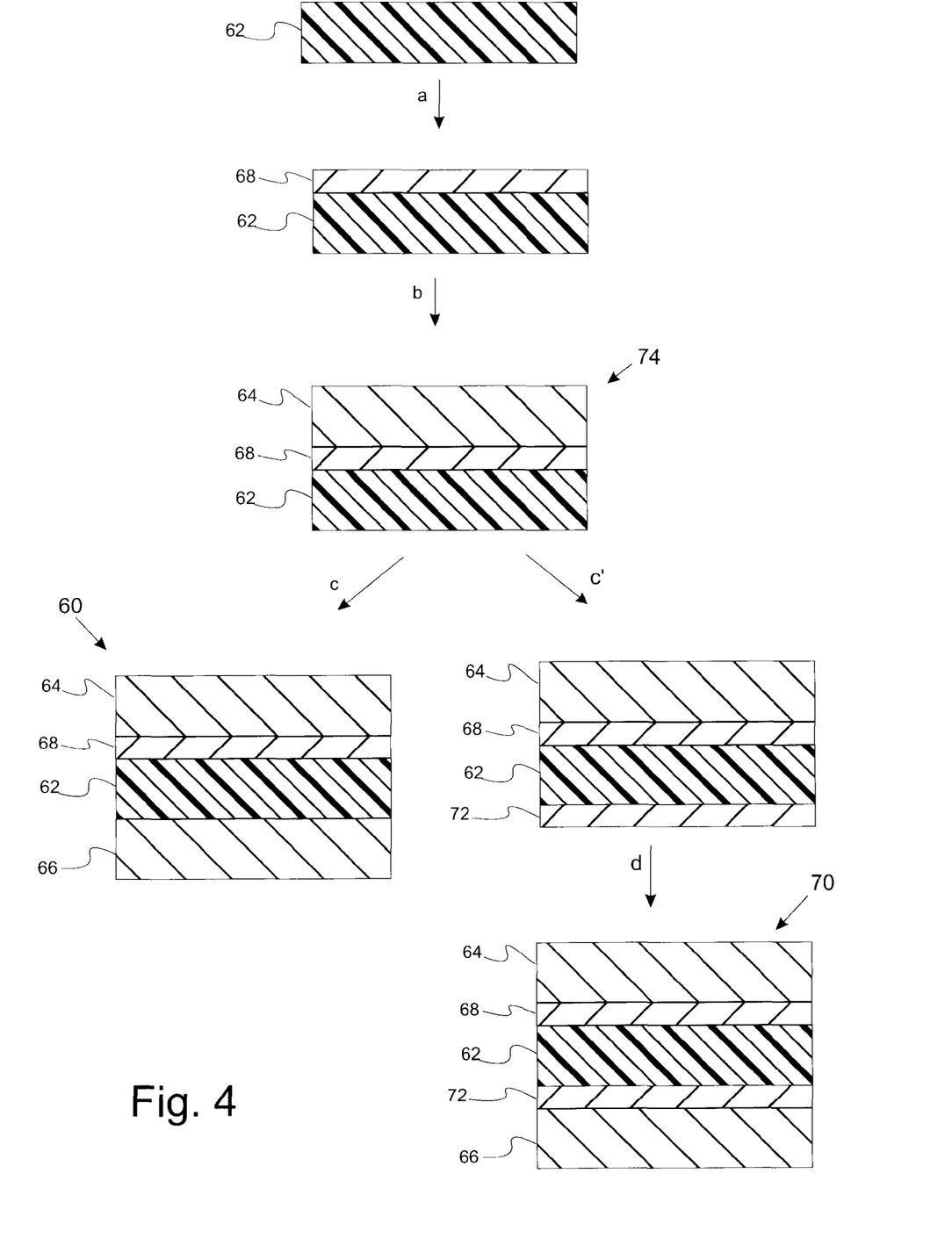
FIG. 4 is a flow chart describing a variation of a membrane electrode assembly fabrication method.

With reference to FIG. 4, a pictorial flow chart showing preparation of the membrane electrode assemblies depicted in FIGS. 2 and 3 is provided. OER catalyst containing ionic layer 68 is contacted to ion conducting membrane 62 in step a). In one refinement, OER catalyst-containing ionic layer 68 is coated onto ion conducting membrane 62. In another refinement, OER catalyst containing ionic layer 68 is a preformed layer that is placed onto ion conducting membrane 62. In step b), first electrode 64 is contacted with OER catalyst-containing layer 68 to form intermediate structure 74. In step c), second electrode 66 is contacted with ion conducting layer 62 resulting in the completion of MEA 60 depicted in FIG. 2.

In a variation, step c') is followed instead of step c). In step c'), OER catalyst-containing layer 72 is contacted with ion conducting layer 62. Finally, in step d), second electrode 66 is contacted with OER catalyst-containing layer 72 resulting in the completion of MEA 60 depicted in FIG. 3.

Figure 5:
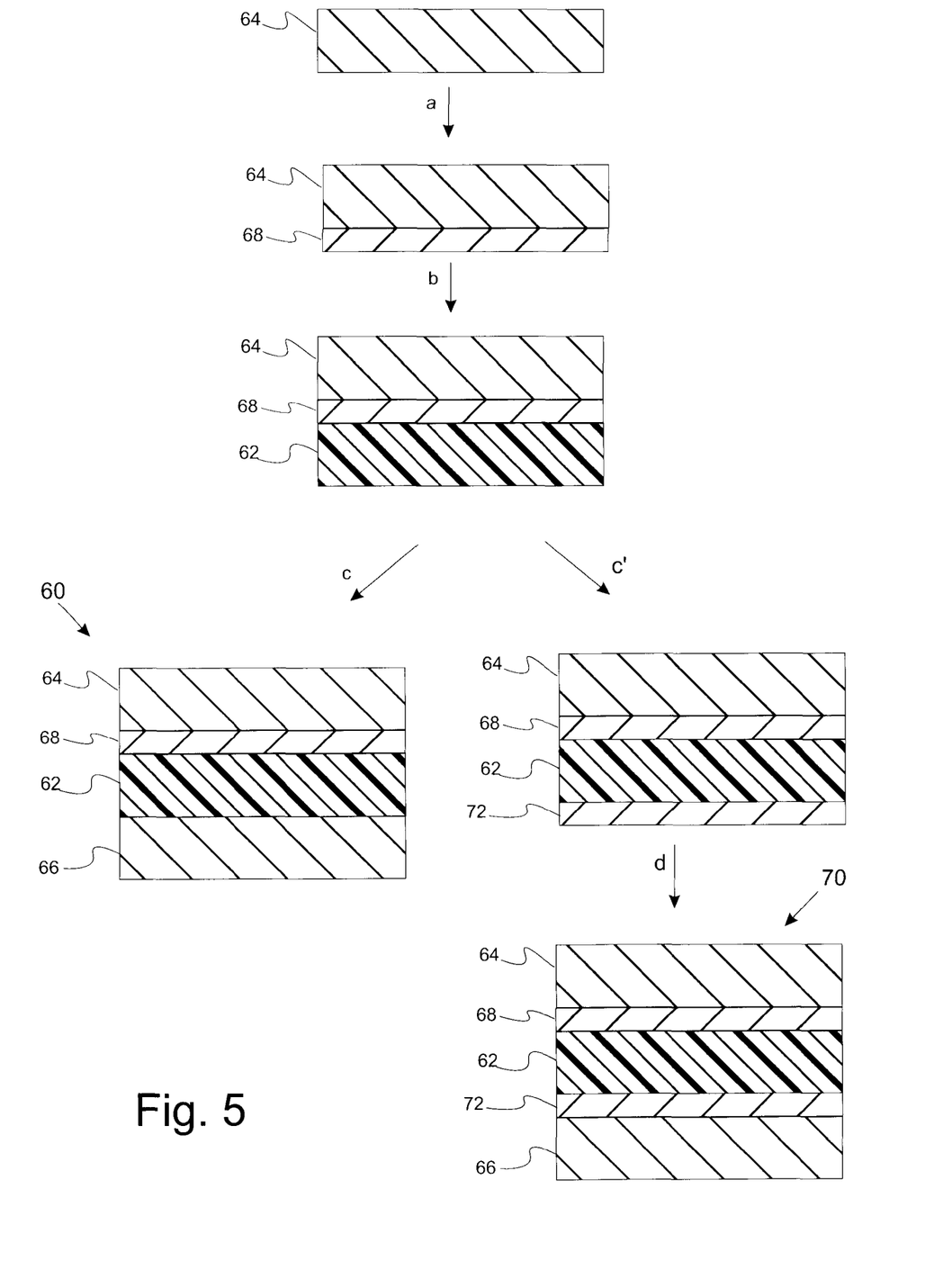
FIG. 5 is a flow chart describing a variation of a membrane electrode assembly fabrication method.

With reference to FIG. 5, a pictorial flow chart showing preparation of the membrane electrode assemblies depicted in FIGS. 2 and 3 is provided. OER catalyst containing layer 68 is contacted to first electrode 64 in step a). In one refinement, OER catalyst-containing layer 68 is coated onto first electrode 64. In another refinement, OER catalyst containing layer 68 is a preformed layer that is placed onto first electrode 64. In step b), ion-conducting layer 62 is contacted with OER catalyst-containing layer 68 to form intermediate structure 74. In step c), second electrode 66 is contacted with ion conducting layer 62 resulting in the completion of MEA 60 depicted in FIG. 2. In a variation, step c') is followed instead of step c). In step c'), OER catalyst-containing layer 72 is contacted with ion conducting layer 62. Finally, in step d), second electrode 66 is contacted with OER catalyst-containing layer 72 resulting in the completion of MEA 60 depicted in FIG. 3.

Figure 6:
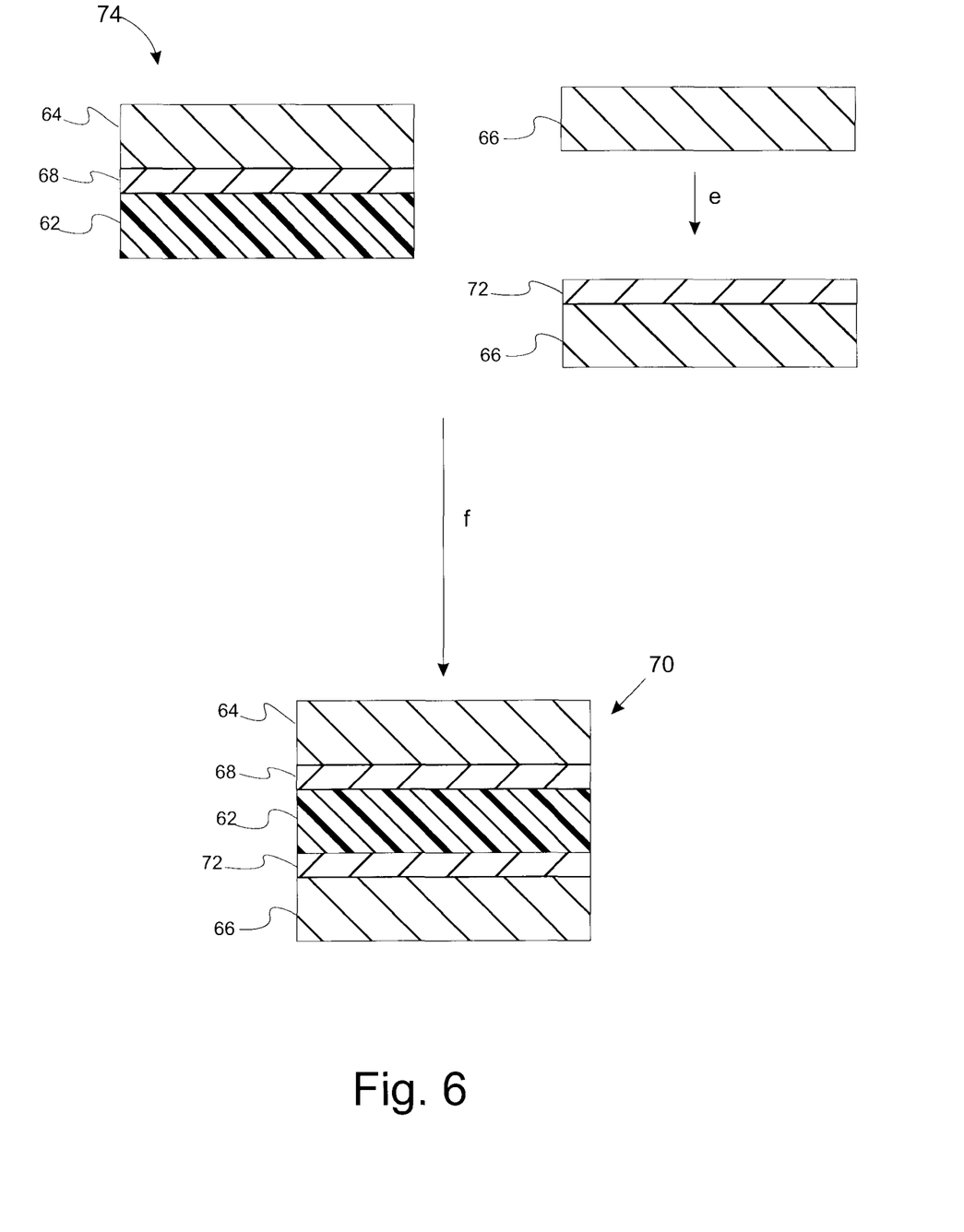
FIG. 6 is a flow chart of an alternative route for forming an MEA from an intermediate structure.

With reference to FIG. 6, an alternative route for forming MEA 70 from intermediate structure 74 is provided. This pathway may be used an alternative to the latter steps of FIGS. 4 and 5. In step e), OER catalyst-containing layer 72 is contacted with second electrode 66. The combination of OER catalyst-containing layer 72 and second electrode 66 is then contacted with intermediate structure 74 to form MEA 70.

The following examples illustrate the various embodiments of the present invention. Those skilled in the art will recognize many variations that are within the spirit of the present invention and scope of the claims.

EXAMPLES

A series of catalyst and cell samples are prepared in order to evaluate their performance and compare their ability in improving cell tolerance toward corrosion. The MEAs for the cells employed a conventional cathode having a platinum catalyst supported on Vulcan grade furnace black, 50% platinum by weight, applied to a porous carbon substrate, and conventional perfluorinated solid polymer membrane (PFSA, DuPont).

Preparation of an Iridium-Containing Layer

About 20.7 g of polymer dispersion (28% by weight polymer) and 0.14 g of iridium oxide supported on GrHSC (iridium 25% by weight) are mixed with 68.2 g of ethanol, 27 g of water and 30 mL of 5 mm diameter beads. The mixture is shaken on the roller for about 24 hours. Targeted loadings for the polymer and iridium are 0.16 mg/cm$^2$ and 0.001 mg/cm$^2$, respectively. The polymer/carbon weight ratio in this representative example is 55. The mixture of the polymer electrolyte and iridium oxide is applied to the electrodes by using a slot-die coating procedure. The representative value of the thickness of the dry Iridium oxide containing ionic layer is $0.9 \times 10^{-6}$ m. The thickness is determined by scanning electron microscopy.

Figure 7A:
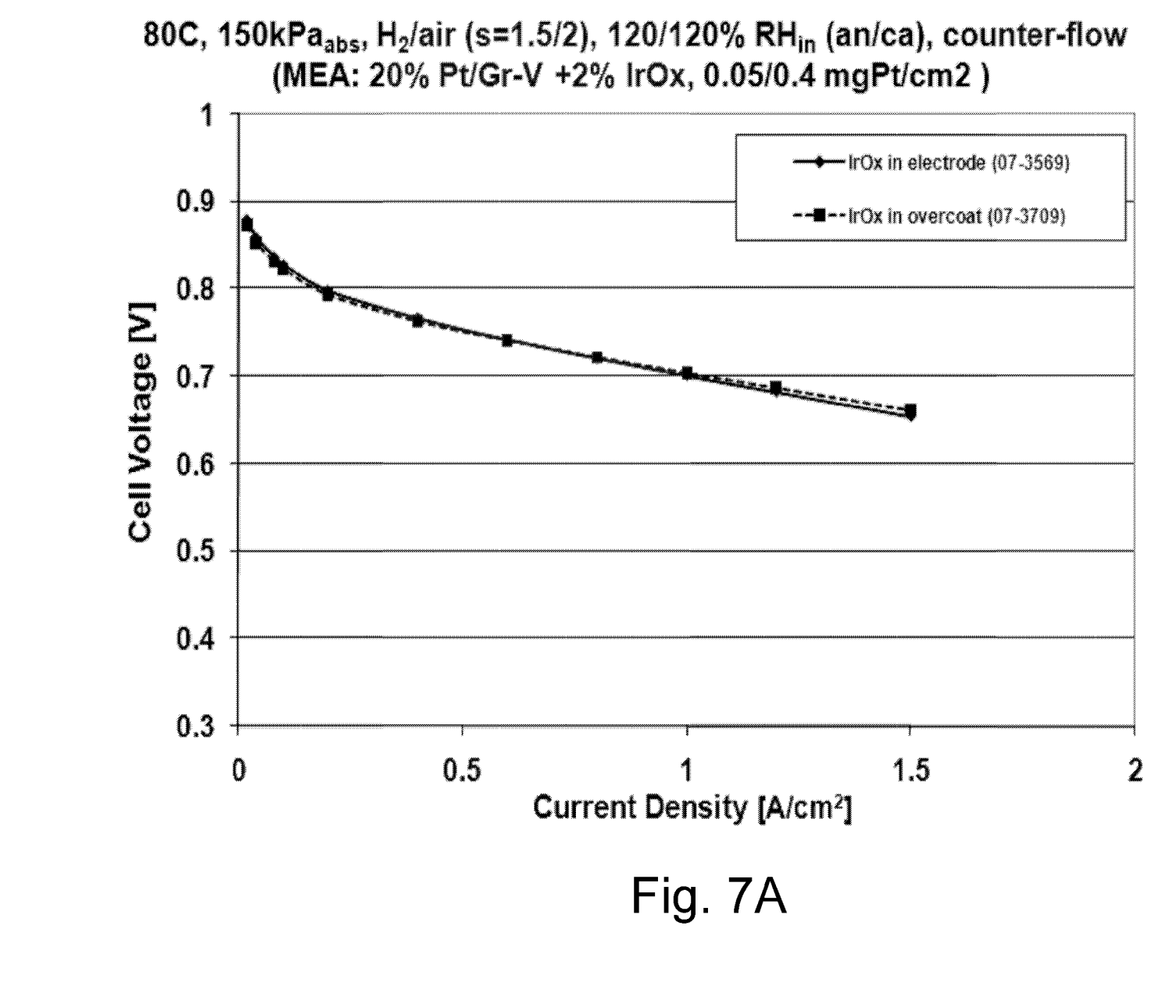
FIG. 7A provides plots of output voltage as a function of current density at 120% relative humidity in a fuel cell where an OER catalyst is incorporated into an anode.
Figure 7B:
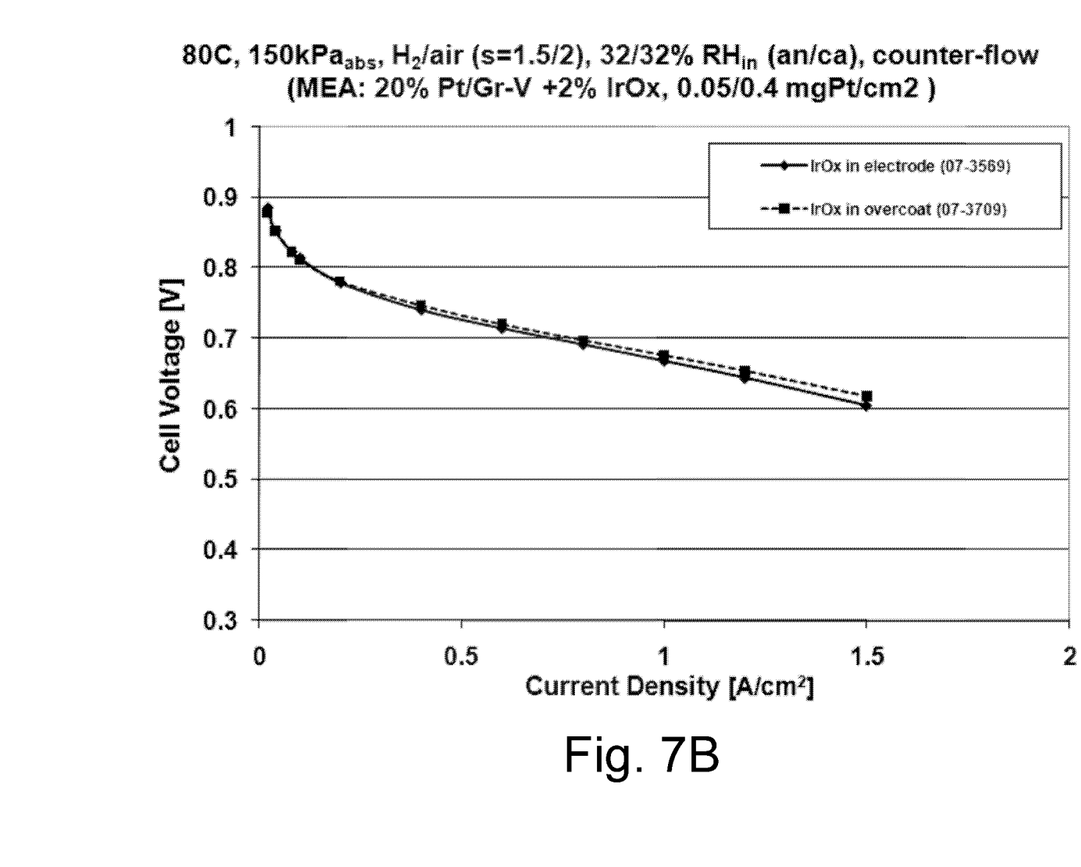
FIG. 7B provides plots of output voltage as a function of current density at 32% relative humidity in a fuel cell where an OER catalyst is incorporated into an anode.

FIGS. 7A and 7B provide plots of fuel cells performance in which fuel cell voltage is plotted as a function of current density. For each figure, two different fuel cell configurations are studied. In one cell, iridium oxide is embedded into a first catalyst platinum-containing electrode, indicated as "IrOx in electrode". In the other cell, iridium oxide catalyst is embedded the Iridium oxide containing ionic layer on the anode side, indicated as "IrOx in overcoat". In both cases, the amount of iridium referenced to the amount of platinum is 2%, regardless of the location of the iridium-containing compound (electrode or overcoat). The test of FIG. 7A is further characterized by the relative humidity (RH), which is 120% for the anode and 120% for the cathode. The test of FIG. 7B is further characterized by the relative humidity, which is 32% for the anode and 32% for the cathode. For both FIGS. 7A and 7B, the testing is performed at 80° C. and 150 kPa abs. The MEA used in this test were also characterized by a cathode loading of 0.4 mg Pt/cm$^2$ and an anode loading of 0.05 mg Pt/cm$^2$. Both types of cells show very similar satisfactory performance overall in both dry and humidified operational conditions. No difference in voltage is observed across all current densities.

Figure 8:
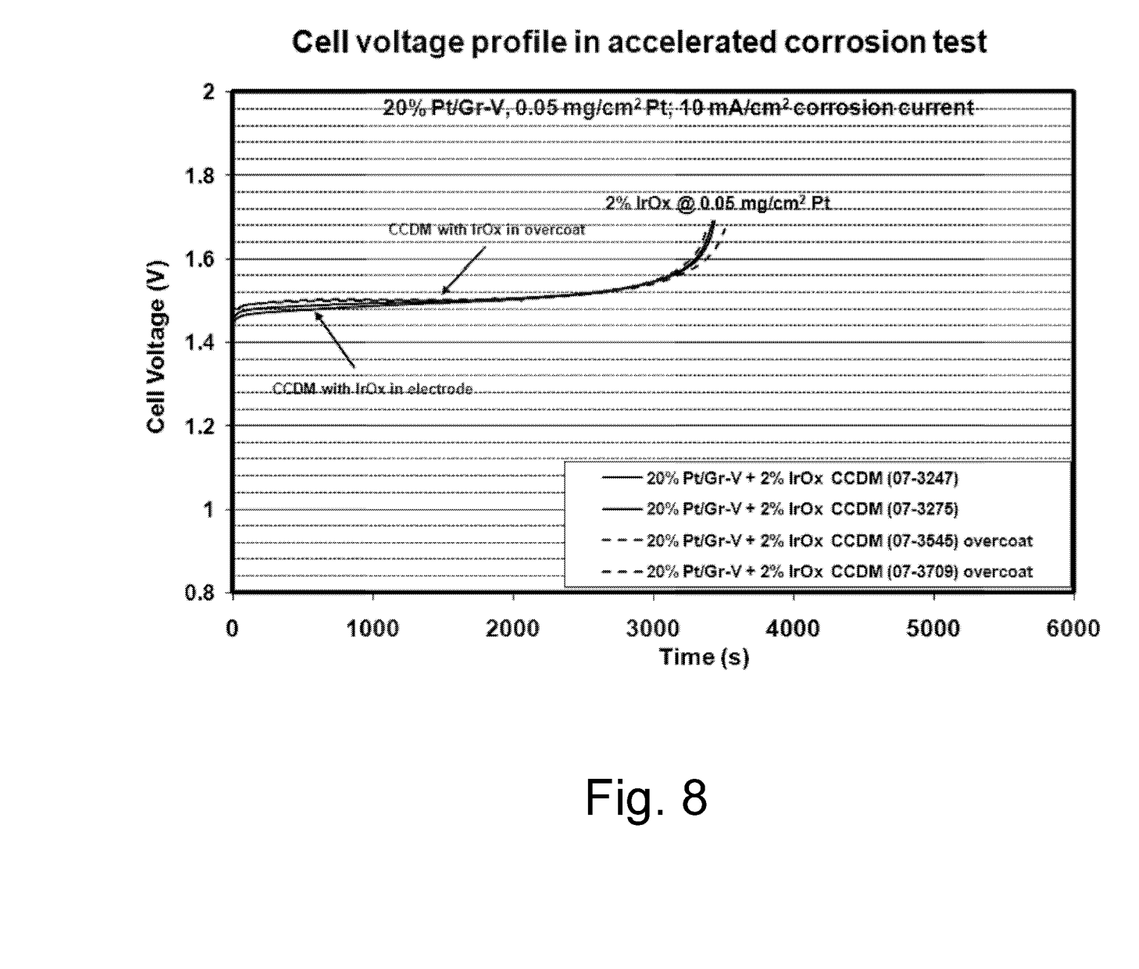
FIG. 8 provides plots of cell voltage as a function of time for two different fuel cells configurations undergoing an accelerated corrosion test.

FIG. 8 shows accelerated corrosion tests for the fuel cells with two different configurations as described in connection with FIGS. 7A and 7B. The accelerated corrosion tests are conducted to evaluate the effectiveness of the Iridium oxide containing ionic layer in mitigating carbon corrosion during cell reversal due to global fuel (H$_2$) starvation in the anode. The test is conducted at 80 C and 100% relative humidity and ambient pressure. The test piece to be studied (in this case the anode) is flowed with N$_2$ gas; the cathode is flowed with a 5% H$_2$ in N$_2$ gas and a 10 mA/cm$^2$ current density (0.5 A total for a 50 cm$^2$ cell) is pulled from the cell. The voltage rises as it looks for a reaction to support the oxidation current flow from the anode side; in this case the oxygen evolution reaction (OER) in which iridium in the ionic layer is utilized is reached. As can be seen in FIG. 8, regardless of the location of the iridium-containing compound, the two type of cells behave the same, i.e., Iridium in the ionic layer is as effective as in the electrode layer in protecting the anode carbon support from severe corrosion The above examples show that, for a given carbon support, the iridium oxide containing ionic layer provides the same level of electrode protection as when iridium oxide is embedded into the first catalyst platinum-containing electrode.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A fuel cell comprising:
   a first bipolar plate having one or more channels for introducing a first gas to the fuel cell;
   a second bipolar plate having one or more channels for introducing a second gas to the fuel cell;
   a first gas diffusion layer adjacent to the first bipolar plate;
   a second gas diffusion layer adjacent to the second bipolar plate;
   an anode layer adjacent to the first gas diffusion layer, the anode layer including a first catalyst selected from the group consisting of platinum, platinum-containing compounds, and mixtures thereof;
   a cathode layer adjacent to the second gas diffusion layer, the cathode layer including a second catalyst selected from the group consisting of platinum, platinum-containing compounds, and mixtures thereof;
   an ion conducting polymer membrane positioned between anode layer and the cathode layer; and
   a first oxygen evolution catalyst-containing layer positioned between the anode layer and the ion conducting polymer membrane, the first oxygen evolution catalyst-containing layer comprising a first oxygen evolution catalyst, a first ion conducting polymer and carbon, wherein a weight ratio of the first ion conducting polymer to carbon is from about 10:1 to about 100:1, the first oxygen evolution catalyst-containing layer being substantially free of precious metal compounds other than iridium and including an iridium-containing compound; and
   a second oxygen evolution catalyst-containing layer, optionally including iridium or iridium containing compounds, positioned between the ion conducting polymer membrane and the cathode layer, the second oxygen evolution catalyst-containing layer being substantially free of precious metals other than iridium and comprising a second oxygen evolution catalyst, a second ion conducting polymer and carbon.

2. The fuel cell of claim 1 wherein the iridium-containing compound is described by the following formula:

$Ir_xO_y$, wherein:
x is from about 0.8 to about 1.2, and
y is from about 1.8 to about 2.4.

3. The fuel cell of claim 2 wherein the iridium-containing compound is described by formula $Ir_xO_y$, wherein x is about 1.0, and wherein y is about 2.0.

4. The fuel cell of claim 1 wherein oxygen evolution catalyst loading is in a range of about 0.0005 mg/cm$^2$ to about 0.005 mg/cm$^2$.

5. The fuel cell of claim 1 wherein the weight ratio of the first ion conducting polymer to carbon of about 55:1.

6. The fuel cell of claim 1 wherein the first ion conducting polymer and the second ion conducting polymer are selected from a group consisting of Nafion ionomer, sulfonated polytrifluorostyrene, sulfonated hydrocarbon polymer, polyimide, polyvinylidene fluoride, polybenzimidazole, polysulfone, polyethersulfone, polyetherketone, polyphenylenesulfide, polyphenyleneoxide, polyphosphazene, polyethylenenaphthalate, polyamide, and polyester.

7. The fuel cell of claim 1 wherein the ion conducting polymer membrane comprises a component selected from a group consisting of Nafion ionomer, sulfonated polytrifluorostyrene, sulfonated hydrocarbon polymer, polyimide, polyvinylidene fluoride, polybenzimidazole, polysulfone, polyethersulfone, polyetherketone, polyphenylenesulfide, polyphenyleneoxide, polyphosphazene, polyethylenenaphthalate, polyamide, and polyester.

8. The fuel cell of claim 1 wherein the first catalyst is selected from the group consisting of precious metals, alloys of precious metals and mixtures of precious metals.

9. The fuel cell of claim 1 wherein the first catalyst is selected from the group consisting of platinum, ruthenium, platinum-containing compounds, ruthenium-containing compounds and mixtures thereof.

10. The fuel cell of claim 1 wherein the second catalyst is selected from the group consisting of precious metals, alloys of precious metals and mixtures of precious metals.

11. The fuel cell of claim 1 wherein the second catalyst is selected from the group consisting of platinum, ruthenium, platinum-containing compounds, ruthenium-containing compounds and mixtures thereof.

12. The fuel cell of claim 1 wherein the second oxygen evolution catalyst comprises a component selected from the group consisting of $RuO_z$ and $RuO_z$—$TiO_2$ where z is a number from 1.5 to 2.5.

13. The fuel cell of claim 1 wherein the second oxygen evolution catalyst comprises a component selected from the group consisting of ruthenium oxides, ruthenium oxide-titanium oxide, indium oxides, and combinations thereof.

* * * * *